United States Patent
Kaul (10) Patent No.: US 12,147,848 B2
(45) Date of Patent: Nov. 19, 2024

(54) EFFICIENT NODE IDENTIFICATION FOR EXECUTING CLOUD COMPUTING WORKLOADS

(71) Applicant: Red Hat, Inc., Raleigh, NC (US)

(72) Inventor: Yaniv Kaul, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 558 days.

(21) Appl. No.: 17/445,543

(22) Filed: Aug. 20, 2021

(65) Prior Publication Data

US 2023/0055276 A1 Feb. 23, 2023

(51) Int. Cl.
*G06F 9/46* (2006.01)
*G06F 9/4401* (2018.01)
*G06F 9/50* (2006.01)

(52) U.S. Cl.
CPC .......... *G06F 9/5083* (2013.01); *G06F 9/4406* (2013.01); *G06F 9/5033* (2013.01); *G06F 9/5044* (2013.01); *G06F 9/5077* (2013.01)

(58) Field of Classification Search
CPC .... G06F 9/5083; G06F 9/4406; G06F 9/5033; G06F 9/5044; G06F 9/5077
See application file for complete search history.

(56) References Cited

U.S. PATENT DOCUMENTS

| | | | |
|---|---|---|---|
| 9,542,219 B1 * | 1/2017 | Bryant | G06F 9/5077 |
| 10,897,497 B2 | 1/2021 | Sabath et al. | |
| 2018/0302299 A1 * | 10/2018 | Sun | H04L 67/10 |
| 2019/0179678 A1 | 6/2019 | Banerjee et al. | |

FOREIGN PATENT DOCUMENTS

| | | |
|---|---|---|
| CN | 106027643 B | 10/2018 |
| CN | 111045821 A | 4/2020 |
| CN | 107493191 B | 12/2020 |
| CN | 12235383 A | 1/2021 |

OTHER PUBLICATIONS

Newrelic.com, "A Complete Introduction to Monitoring Kubernetes with New Relic", https://newrelic.com/platform/kubernetes/monitoring-guide, downloaded Aug. 20, 2021, 2021, 36 pages.

* cited by examiner

*Primary Examiner* — Gregory A Kessler
(74) *Attorney, Agent, or Firm* — Womble Bond Dickinson (US) LLP (57) ABSTRACT

A workload execution manager receives a request to execute a workload process in a cloud computing environment, where the cloud computing environment comprises a plurality of nodes; identifies a set of eligible nodes of the plurality of nodes for executing the workload process; determines whether a first eligible node of the set of eligible nodes satisfies a version threshold; responsive to determining that the first eligible node satisfies the version threshold, selects the first eligible node as a target node for executing the workload process; and executes the workload process on the target node.

20 Claims, 6 Drawing Sheets

EFFICIENT NODE IDENTIFICATION FOR EXECUTING CLOUD COMPUTING WORKLOADS

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of application workloads without the cost and complexity of buying and managing the underlying hardware and software and provisioning hosting capabilities, providing the facilities to support the complete life cycle of building and delivering application workloads and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for facilitating efficient node identification for executing workloads in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider. Moreover, executable workloads can be dynamically relocated from one node to another to improve resource allocation and utilization within the cloud computing environment.

Cloud computing environments, however, can present challenges with the management of executable workloads. Cloud computing network clusters can include nodes that are configured with particular resource attributes, including processors, memory, disk space, and operating system (OS) version. These nodes may periodically be individually updated/upgraded to modify the resource attributes and/or OS version. When a node is upgraded, the containers or workloads are rescheduled to execute on a different node, causing a disruption to the executing workload. This process can be ongoing within the environment, where nodes are drained, upgraded, rebooted, and reallocated to workloads at different times during the execution cycle of the workloads within the environment. This can result in repeated service disruptions to executable workloads if they are migrated from one node to another node which may be updated soon thereafter. This can cause the workload to be migrated over and over, which can be particularly problematic in large enterprise environments with many nodes.

Some conventional cloud computing environments attempt to mitigate the risk of cascading disruptions by upgrading nodes in large groups. This, however, can cause significant increases in network wide outages until the groups are all upgraded. Additionally, this can result in significant decreases in performance and throughput for the nodes that are not being upgraded since additional workloads may be scheduled on those nodes while other nodes are being upgraded. Other solutions may attempt to schedule node upgrades during workload downtime. This, however, requires increased complexity in the scheduler and can often result in unscheduled downtime for a workload.

Aspects of the present disclosure address the above noted and other deficiencies by implementing a workload execution manager (e.g., as a computer program or a computer program component) to facilitate efficient node identification for executing workloads in a cloud computing environment. The workload execution manager can receive a request to execute a workload in the environment. This can occur either to launch a new workload within the environment, or to relocate an executing workload from a node in need of upgrade to another node. The workload execution manager can identify nodes within the environment that have the appropriate resources to execute the workload (e.g., the nodes that are eligible to execute the workload). Once eligible nodes have been identified, the workload execution manager can determine which of the eligible nodes satisfy an OS version threshold associated with the workload (e.g., the newest version of the OS, a particular version of the OS, etc.). A node that satisfies the OS version threshold can be selected as a target node for the workload. The workload execution manager can subsequently execute the workload on the target node.

Aspects of the present disclosure present advantages over conventional solutions to the issues noted above. First, the workload execution manager of the present disclosure is capable of identifying target nodes that are least likely to be upgraded such as target nodes with newest OS versions. By identifying a target node with the newest version of an OS, the workload execution manager can significantly increase availability of that node before a subsequent upgrade may be scheduled. This, in turn, can significantly reduce the service disruption to workloads caused by repeated relocation of those workloads since the likelihood of draining a node with the newest version of the OS is extremely low. Additionally, since newer versions of an OS are least likely to be unstable, identifying nodes with the newest version of an OS can provide increased stability in the environment for executable workloads. Moreover, by minimizing workload service disruptions, the workload execution manager can improve stability of executing workloads within the cloud computing environment, providing increased efficiency in management of cloud computing resources overall.

Figure 1:
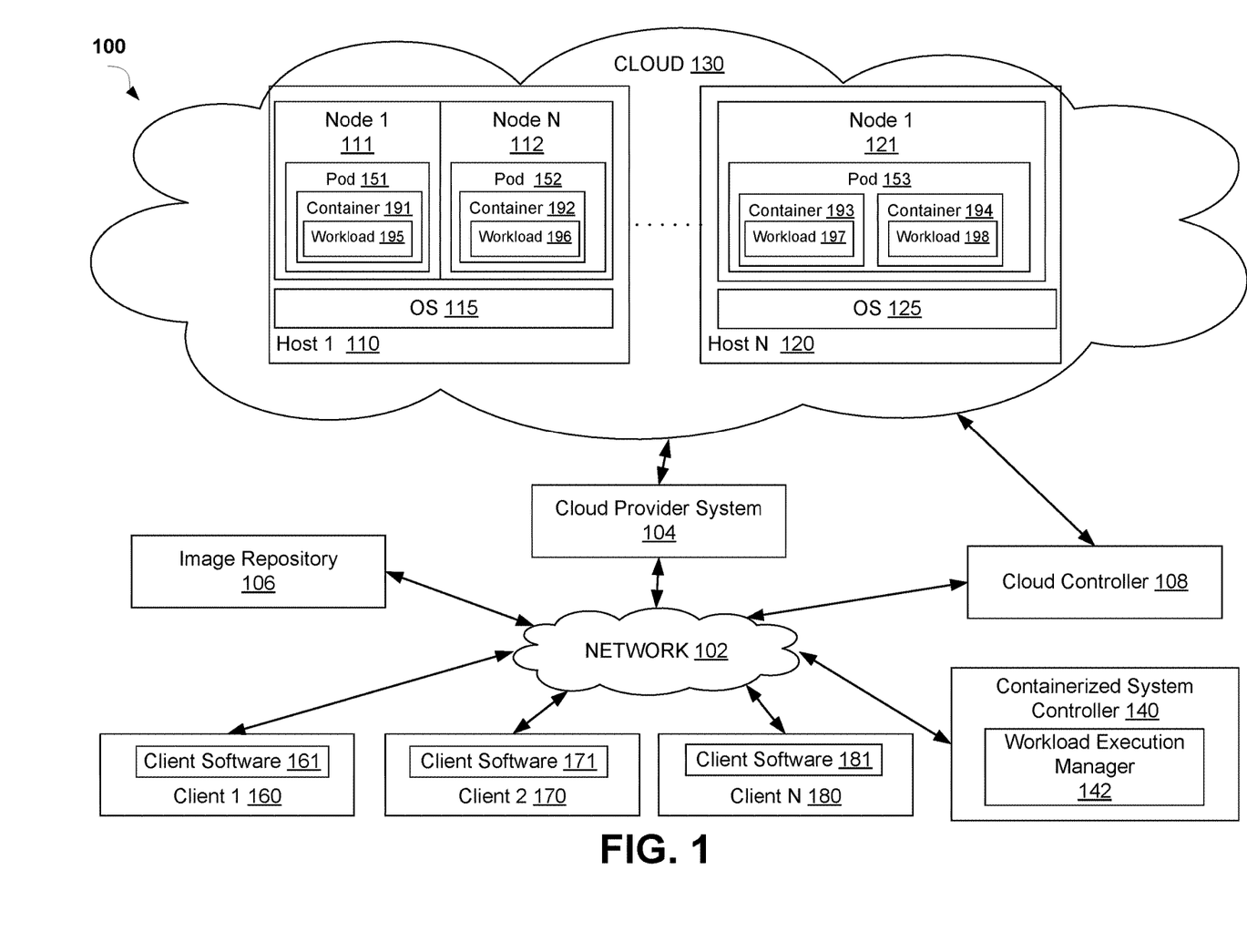
FIG. 1 depicts a high-level component diagram of an example computer system architecture, in accordance with one or more aspects of the present disclosure.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In one implementation, the data is used for execution of containers 191, 192, 193, 194 in one or more pods 151, 152, 153. The pods 151, 152, 153 area group of one or more containers that are deployed together on the same node 111, 112, 121, and are the smallest compute unit that can be defined, deployed, and managed in the containerized computing service environment. Each pod 151, 152, 153 is allocated its own internal IP address, with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In some implementations, the application images can be built using various types of containerization technologies (e.g., Docker™). An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

In various implementations, a container 191, 192, 193, 194 can be a secure process space on the nodes 111, 112, 121 to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In various implementations, containers 191, 192, 193, 194 can include one or more executable workloads 195, 196, 197, 198. Workloads 195, 196, 197, 198 can be standalone applications to be executed in containers 191, 192, 193, 194 or virtual machine (VM), a virtual machine that itself hosts one or more applications, or the like. In some implementations, the executable workloads can be the containers 191, 192, 193, 194 themselves that host one or more applications or VMs, or the like.

In some implementations, the containerized system controller 140 may include a workload execution manager 142 that implements efficient node identification for executing workloads for the cloud-based PaaS system described above. Workload execution manager 142 can receive a request to execute a workload or to relocate a workload from one node to another. Upon receiving the request, workload execution manager 142 can analyze the resource attributes of available nodes in relation to resource preferences associated with the workload to identify eligible nodes for executing the workload. Subsequently, workload execution manager 142 can further narrow the field of eligible nodes by determining whether any of the eligible nodes satisfy an operating system (OS) threshold using an OS preference associated with the workload. Thus, Workload execution manager 142 can select a target node that not only satisfies the resource preferences for the workload, but also satisfies a OS preference for the workload.

Workload execution manager 142 can receive a request to execute a workload in cloud 130. In some implementations, the request may be received from one of clients 160, 170, 180. Alternatively, the request may be received from a scheduling component of the containerized system controller 140. The request may be associated with a new workload to be executed within cloud 130. Alternatively, the request may be responsive to identifying a currently executing workload that may be located on a node that is selected for an OS upgrade. In such instances, workload execution manager 142 can receive the request to relocate the executing workload to another node within cloud 130. In various implementations, the workload can be relocated to a node that has the newest (e.g., the most recently released) version of the OS to minimize any further disruptions to the workload that may be caused by additional node upgrades. In other implementations, workload execution manager 142 can select a target node with a specific version of an OS or a version of an OS other than the most recent version, using OS version preferences associated with the workload to be relocated.

As will be discussed in further detail below, workload execution manager 142 can identify a set of eligible nodes from cloud 130 by first determining the resource preference information associated with the workload. The resource preference information can indicate the types of resources that should be present in an eligible target node for executing the workload process. For example, node resource preferences 203 can include a processor preference (e.g., a number of processors available to the node, a particular type of processor available to the node, etc.), a memory allocation preference (e.g., a total amount of memory available to the node), a graphics processing unit (GPU) preference (e.g., whether a GPU is available to the node, the type of GPU available to the node, etc.), a virtual machine (VM) preference (e.g., the type of VM available to the node, the number of VMs available to the node, etc.), a storage allocation preference (e.g., the amount of storage space allocated to the node, etc.), or other similar information.

Workload execution manager 142 can compare the resource preference information to the attributes of the nodes in cloud 130 to determine which of the nodes are eligible to be selected as the target node for the workload. Subsequently, workload execution manager 142 can determine which of the eligible nodes satisfy an OS version threshold using the OS preferences associated with the workload. Upon identifying a target node that satisfies the OS version threshold, workload execution manager 142 can execute the workload on the target node.

While aspects of the present disclosure describe the workload execution manager 142 as implemented in a PaaS environment, it should be noted that in other implementations, the security profile manager can also be implemented in an Infrastructure-as-a-Service (Iaas) environment, such as such as Red Hat OpenStack®. Additionally, while for simplicity of illustration, FIG. 1 depicts a single cloud 130, aspects of the present disclosure can be implemented to manage workloads across multiple clouds 130. In such instances the workload execution manager 142 can manage node identification for hybrid cloud environments, multi-cluster cloud environments, or the like. Workload execution manager 142 is described in further detail below with respect to FIGS. 2-3.

Figure 2:
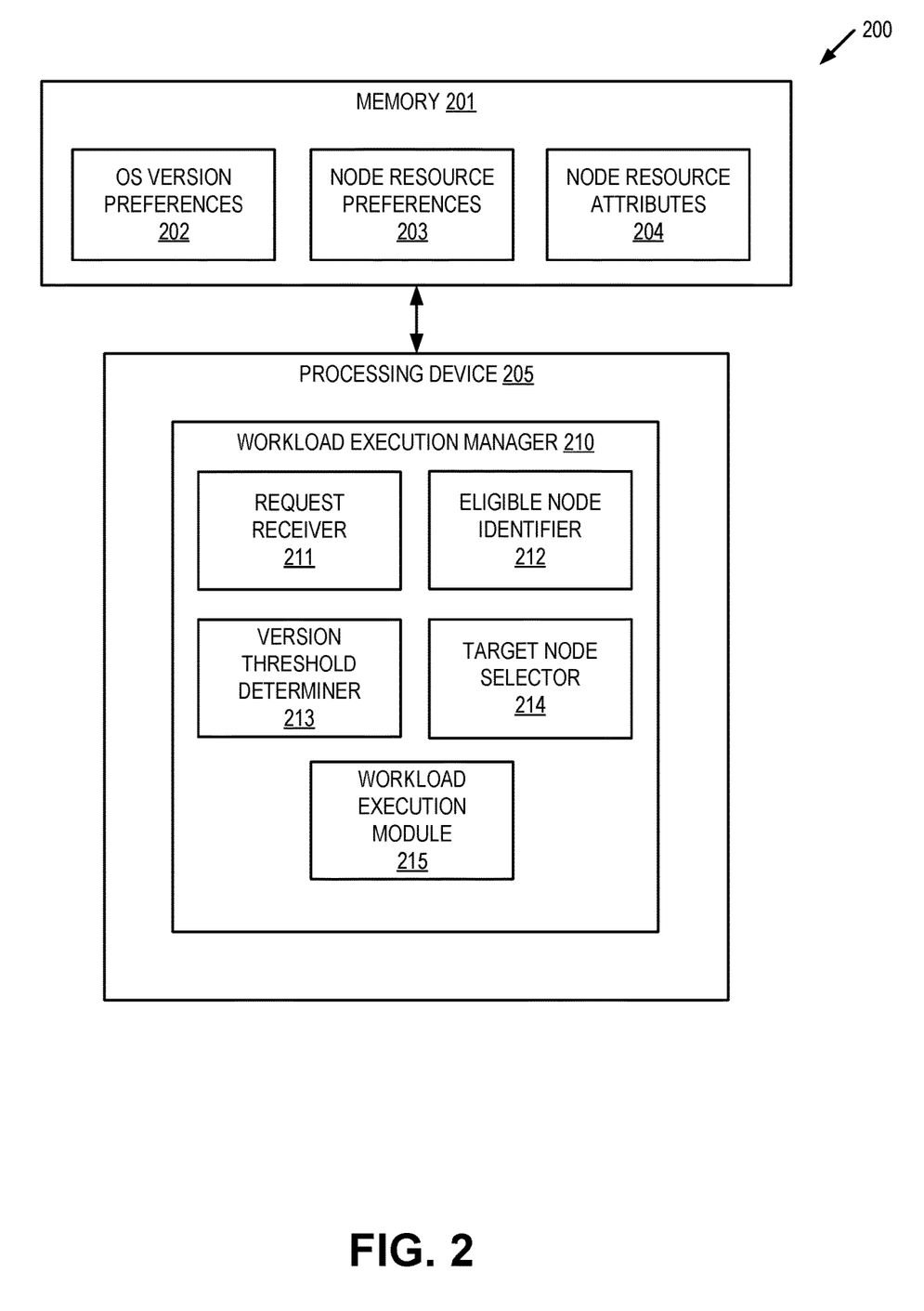
FIG. 2 depicts a block diagram illustrating an example of a workload execution manager for facilitating efficient node identification for executing workloads in a cloud computing environment, in accordance with one or more aspects of the present disclosure.

FIG. 2 depicts a block diagram illustrating an example of a workload execution manager 210 for facilitating efficient node identification for executing workloads in a cloud computing environment. In some implementations, workload execution manager 210 may correspond to workload execution manager 142 of FIG. 1. As shown in FIG. 2, workload execution manager 210 may be a component of a computing apparatus 200 that includes a processing device 205, operatively coupled to a memory 201, to execute workload resource manager 210. In some implementations, processing device 205 and memory 201 may correspond to processing device 502 and main memory 504 respectively as described below with respect to FIG. 5.

Workload execution manager 210 may include request receiver module 211, eligible node identifier 212, version threshold determiner 213, target node selector 214, and workload execution module 215. Alternatively, the functionality of one or more of request receiver module 211, eligible node identifier 212, version threshold determiner 213, target node selector 214, and workload execution module 215 may be combined into a single module or divided into multiple sub-modules.

Request receiver module 211 is responsible for receiving a request to execute a workload process in a cloud computing environment. As noted above, in some implementations, the cloud computing environment can be a containerized environment that includes multiple nodes, where nodes can include pods, and where each pod can include one or more containers that can be used to execute a process (or processes) within the environment. In various implementations, the workload process can be a standalone application to be executed in a container or virtual machine (VM), a virtual machine that itself hosts one or more applications, a container process that itself hosts one or more applications or VMs, or the like. Cloud computing environments configured in such a manner can be an OpenShift® based environment, a Kubernetes® based environment, or the like. In some implementations, the cloud computing environment can be a hybrid cloud or multi-cluster cloud environment made up of multiple clouds of the same or different cloud providers (e.g., one cloud may be an OpenShift® cloud, a second cloud could be a Kubernetes® cloud, a third cloud could be an Amazon Web Services® (AWS) cloud, etc.).

In various implementations, request receiver module 211 can receive the request to execute the workload from a client device (e.g., client devices 160, 170, 180 of FIG. 1). The request may be received from a developer or system administrator of the cloud computing environment to execute an application process. Alternatively, the request may be received from an end user accessing a cloud computing service provided by the environment. In other implementations, the request can be received from a scheduler component of the cloud computing environment (e.g., a component of cloud controller 108 or containerized system controller 140) to execute a workload or relocate a workload that is executing on a node that is to be upgraded (e.g., a node targeted for an OS or other system upgrade).

In some implementations, request receiver module 211 can receive additional preference information associated with the workload process to be used in selecting a target node for executing the workload process. Request receiver module 211 can receive node resource preference information (e.g., node resource preferences 203) that indicate the types of resources that should be present in an eligible target node for executing the workload process. For example, node resource preferences 203 can include a processor preference (e.g., a number of processors available to the node, a particular type of processor available to the node, etc.), a memory allocation preference (e.g., a total amount of memory available to the node), a graphics processing unit (GPU) preference (e.g., whether a GPU is available to the node, the type of GPU available to the node, etc.), a virtual machine (VM) preference (e.g., the type of VM available to the node, the number of VMs available to the node, etc.), a storage allocation preference (e.g., the amount of storage space allocated to the node, etc.), or other similar information.

In some implementations, request receiver module 211 can receive OS version preference information associated with the workload process to be executed (e.g., OS version preferences 202) that indicates the OS version that should be present in an eligible target node for executing the workload process. For example, OS version preferences 202 can indicate a particular version of a particular OS that should be present in the target node. Alternatively, OS version preferences 202 can indicate that the target node should include the most recent version of a particular OS in relation to other eligible nodes. In other words, of all the eligible nodes in the environment, the node with the most recently released version should be selected. In some implementations, the OS version preferences 202 can be associated with individual workloads. Alternatively, the OS version preferences 202 can be implemented for a group of workloads, or globally for all workloads.

Eligible node identifier 212 is responsible for identifying a node or group of nodes within the cloud computing environment that may be eligible for executing the workload process. In some implementations, eligible node identifier 212 can identify any node present in the environment that has available bandwidth as an eligible node. In other implementations, eligible node identifier 212 can perform this identification using preference information associated with the workload process (e.g., node resource preferences 203) as described above. The resource preference information can be received by request receiver 211 with the request to execute the workload process. Alternatively, the resource information can be configured and stored by a cloud administrator for the client/owner of the workload process during system configuration. In such cases, eligible node identifier 212 can access the node resource preferences 203 associated with the workload process that were pre-configured by the owner/administrator.

Eligible node identifier 212 can identify the nodes that are available within the environment and determine resource attributes associated with each executing node (e.g., node resource attributes 204). The resource attributes associated with a node can include attributes similar to those attributes described above with respect to the resource preferences (e.g., node resource preferences 203) associated with a workload. In some embodiments, the attributes for a node can be stored in node resource attributes 204 when a node is configured by a cloud/system administrator. Alternatively, eligible node identifier 212 can identify the executing nodes within the environment and identify the resource attributes for each node at the time of the request. In such instances, eligible node identifier 212 can send a request to each node for the resource attributes, scan each node for the attributes, or the like. Once the attributes have been determined, eligible node identifier 212 can store them in node resource attributes 204.

Subsequently, eligible node identifier 212 can compare the resource preferences for the workload to the resource attributes for each node and identify any of the nodes in the system whose resource attributes satisfy the preferences of the requested workload. In some implementations, the node preferences associated with a workload can be configured with corresponding priority values, minimum requirements, and/or degrees of deviation from the preferred preference value so that if an exact match cannot be made to any of the available nodes, a "best fit" match can be determined. In such instances, eligible node identifier 212 can identify any node that while not an exact match to the specified preferences associated with the workload, an eligible node can be identified that includes sufficient resources to execute the workload on that node.

Version threshold determiner 213 is responsible for determining whether any of the eligible nodes identified by eligible node identifier 212 satisfy a version threshold. In some implementations, version threshold determiner 213 can make this determination using a specific version for a target node (e.g., a specific version of an operating system (OS) for a target node). Alternatively, version threshold determiner 213 can make this determination using a most recently released OS version without specifying an OS version specifically. In other words, the OS version preference information can indicate that the most recently released version of the OS should be selected, without specifying a particular version.

For example, if the most recently released version of an OS is 4.0, then the OS version preference can specify 4.0 as the version preference, or it can specify that the most recently released version is to be selected, which would be 4.0. In contrast, if the workload is not to be executed on the most recently released version (e.g., 3.1, 3.2, 3.3, etc.), then the OS version preference can specify a specific version that is less than 4.0. Similarly, the OS version preference can specify an OS version that has a minimum threshold or a maximum threshold. In these instances, the OS version preference can indicate that the target node should have a version that is greater than a particular version, a version that is less than a particular version, or some combination thereof. To continue the previous example, the OS version preference can specify that a target node should have an OS version greater than 3.3, an OS version less than 4.0, an OS version between 3.5 and 3.9, etc.

In various implementations, version threshold determiner 213 can receive information indicating an OS version preference associated with the requested workload (OS version preferences 202). This OS version preference information can be received with the request to execute the workload and stored in OS version preferences 202 by request receiver 211. Alternatively, this information can be stored in OS version preferences 202 by an owner/administrator during workload configuration.

Version threshold determiner 213 can determine whether the OS version preference associated with the workload matches an OS version associated with any of the eligible target nodes identified by eligible node identifier 212. As noted above, this determination can be made as an exact match, or a "best fit match". In some implementations, version threshold determiner 213 can select one of the eligible nodes and compare the OS version preference to the OS version of the selected node. Responsive to determining that the selected eligible node has an OS version that matches the specified OS version preference for the workload, version threshold determiner 213 can determine that this node satisfies the version threshold for the workload. If, however, the OS version preference for the workload does not match the OS version of the node, then version threshold determiner 213 can select another node.

In some implementations, the OS version preferences for the workload can specify that the newest OS version of all the identified nodes satisfies the version threshold. In such instances, version threshold determiner 213 can determine the OS version for each of the identified eligible nodes. Once the OS versions for each node have been determined, version threshold determiner 213 can determine which of the eligible nodes has the most recently released OS version in relation to the other eligible nodes. To continue the above example, if the group of eligible nodes includes a node with OS version 3.1, an node with OS version 3.3, a node with OS version 3.8, and a node with OS version 4.0, version threshold determiner 213 can determine that since OS version 4.0 is the most recently released version in relation to the other eligible nodes (assuming that the OS version numbering scheme for that OS is in ascending numerical order).

Once the node or nodes that satisfy the version threshold have been determined, version threshold determiner 213 can invoke target node selector 213 to select one of the nodes as the target node for the workload.

Target node selector 214 is responsible for selecting a target node for executing the workload process. In some implementations, the first node that satisfies the OS version threshold can be selected as the target node. In such instances, version threshold determiner 213, upon determining that a selected node satisfies the OS version threshold, can invoke target node selector 214 to select that node as the target node. Alternatively, multiple nodes can be identified that satisfy the OS version threshold. In these instances, target node selector 214 can select the target node from the group of nodes provided by version threshold determiner 213. In some implementations, target node selector 214 can select a target node randomly (or pseudo-randomly) from the group. Alternatively, target node selector 214 can select a node from the group that provides the best match for the node resource preferences of the workload. For example, if the workload preferences specify a particular minimum amount of available memory for the node, and more than one node satisfies this minimum threshold, target node selector 214 can select the node that has the largest amount of memory in relation to the other nodes that satisfy this preference.

Workload execution module 215 is responsible for executing the workload process on the selected target node. Once the target node has been selected, workload execution module 215 can initiate execution of the workload on the selected target node. In some implementations, workload execution module 215 can initiate the execution of the workload directly. In such instances, workload execution module 215 can send a notification to the target node with associated information for the workload so the target node (e.g., the OS of the target node) can launch the workload. Alternatively, workload execution module 215 can send a notification to a scheduler component of the cloud computing system to initiate execution of the workload on the target node. In such instances, workload execution module 215 can send information associated with the workload and information identifying the target node so the scheduling component can act accordingly.

It should be noted that while specific examples of resource preferences and resource attributes have been described above with respect to the workload execution manager 210 of FIG. 2, aspects of the present disclosure can be applied similarly to other resource preferences and resource attributes associated with nodes in a cloud computing environment that are configured to execute workload processes.

Figure 3A:
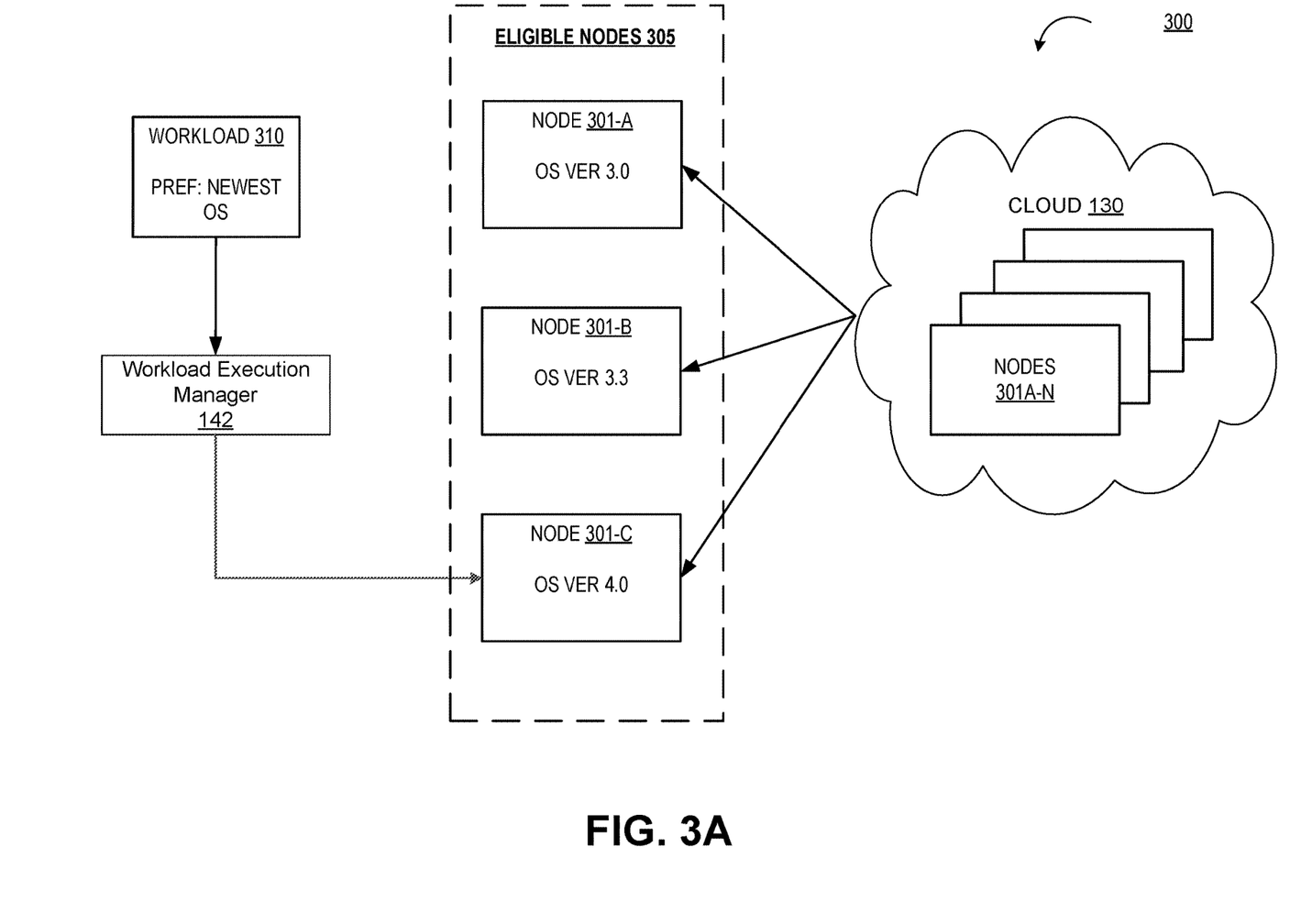
FIG. 3A illustrates an example of efficient node identification for executing workloads in a cloud computing environment, in accordance with one or more aspects of the present disclosure.
Figure 3B:
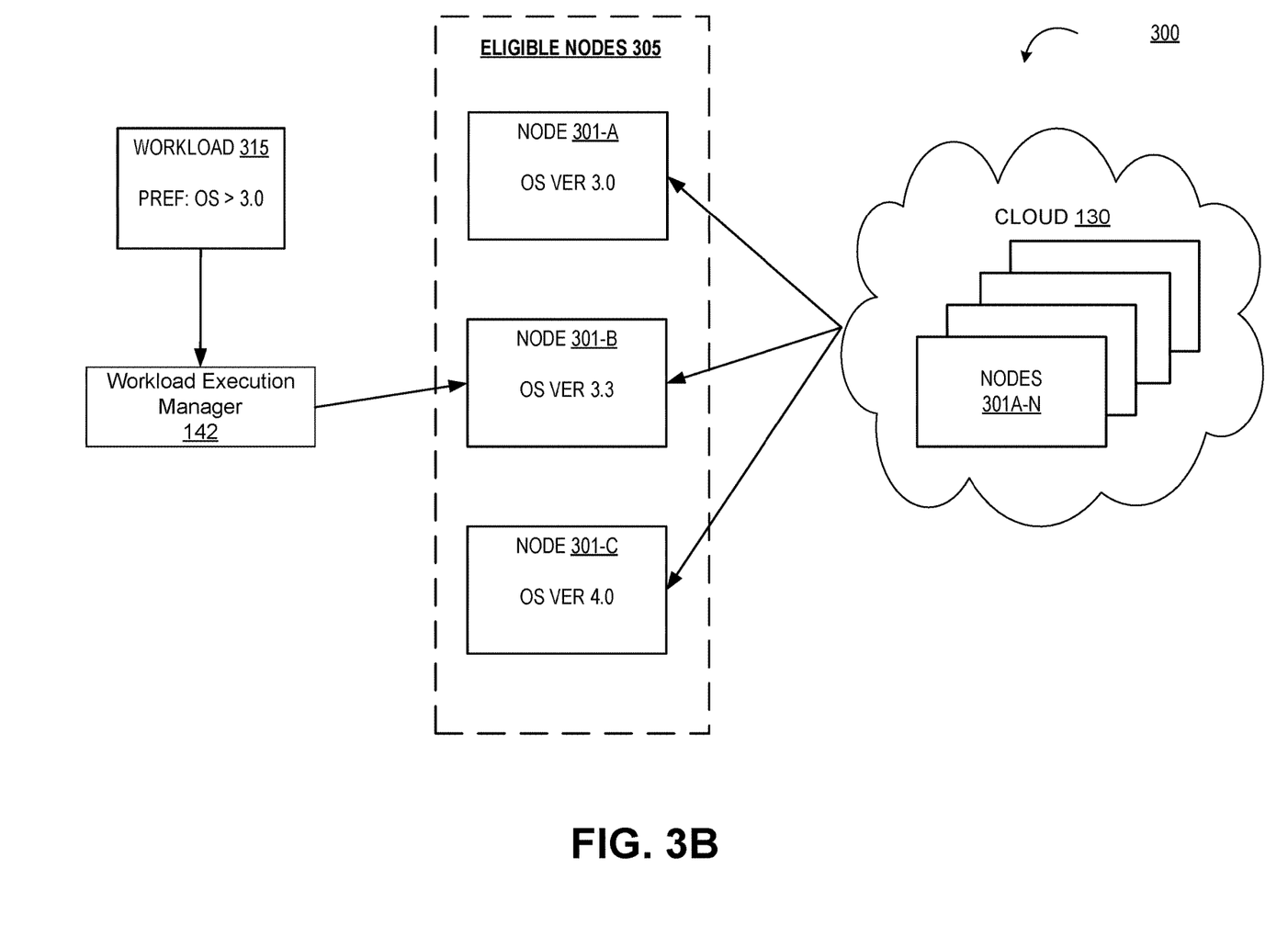
FIG. 3B illustrates another example of efficient node identification for executing workloads in a cloud computing environment, in accordance with one or more aspects of the present disclosure.

FIGS. 3A-3B illustrate examples of efficient node identification for executing workloads in a cloud computing environment. As shown in FIG. 3A, a workload execution manager 142 receives a request to execute workload 310 in a cloud computing environment that includes multiple nodes (e.g., cloud 130 that includes nodes 301A-N). As described above with respect to FIG. 2, workload execution manager 142 can identify a set of eligible nodes (e.g., eligible nodes 305) from the nodes present in cloud 130. Also as described above, workload execution manager 142 can select all available nodes as eligible nodes, or it can select a subset of available nodes as eligible nodes using resource preferences associated with workload 310. As shown in FIG. 3A, workload execution manager 142 has identified nodes 301-A, 301-B, and 301-C as eligible nodes for executing workload 310 in view of the resource preferences associated with workload 310 (not shown) and the resource attributes associated with each of the available nodes (not shown).

Workload execution manager 142 can then determine whether any of the eligible nodes satisfies a version threshold (e.g., an OS version threshold) associated with workload 310. As described above, workload execution manager 142 can make this determination by identifying an OS preference associated with workload 310 and comparing it to each of the available nodes 305. As shown, workload 310 has an OS preference that specifies that the newest version of the OS is preferred for executing the workload. Workload execution manager 142 can then analyze the OS version attributes of each of eligible nodes 301A-C to determine which of the nodes has the newest version of the OS. As shown, node 301-A uses OS version 3.0, node 301-B uses OS version 3.3, and node 301-C uses OS version 4.0. Assuming the particular OS uses an increasing numerical version scheme when newer versions are released, OS version 4.0 would be the newest (or most recent) version of the OS. Accordingly, workload execution manager 142 can determine that node 301-C satisfies the version threshold for workload 310, select node 301-C as the target node for that workload, and execute workload 310 on node 301-C.

As described above with respect to FIG. 2, in instances where more than one node satisfies the threshold (not shown), workload execution manager 142 can select the first node that it identifies (e.g., the first node identified as having satisfied the threshold). Alternatively, workload execution manger 142 can identify all nodes that satisfy the threshold, then select a target node from that group. In some instances, this selection can be performed randomly (or pseudo-randomly). Alternatively, workload execution manager 142 can identify the target node by determining which of the nodes that satisfies the threshold also has the closest match to the resource preferences associated with the workload. For example, if two nodes use OS version 4.0, and one of the nodes has resource attributes (e.g., amount of memory, number of processors, presence of a particular graphics processing unit (GPU), etc.) that are a closer match to the preferences associated with workload 310, then that node that is the closer match can be selected as the target node.

As shown in FIG. 3B, workload execution manager 142 receives a request to execute workload 315 in cloud 130. As described above with respect to FIG. 2, workload execution manager 142 can identify a set of eligible nodes (e.g., eligible nodes 305) from the nodes present in cloud 130. Also as described above, workload execution manager 142 can select all available nodes as eligible nodes, or it can select a subset of available nodes as eligible nodes using resource preferences associated with workload 315. As shown in FIG. 3B, workload execution manager 142 has identified nodes 301-A, 301-B, and 301-C as eligible nodes for executing workload 315 in view of the resource preferences associated with workload 315 (not shown) and the resource attributes associated with each of the available nodes (not shown).

Workload execution manager 142 can then determine whether any of the eligible nodes 305 satisfies a version threshold (e.g., an OS version threshold) associated with workload 315. As described above, workload execution manager 142 can make this determination by identifying an OS preference associated with workload 315 and comparing it to each of the available nodes 305. As shown, workload 315 has an OS preference that specifies that the target node should use a version of the OS that is greater than (newer than, more recently released than) OS version 3.0. Workload execution manager 142 can then analyze the OS version attributes of each of eligible nodes 301A-C to determine which of the nodes uses a version greater than 3.0. As shown, node 301-A uses OS version 3.0, node 301-B uses OS version 3.3, and node 301-C uses OS version 4.0. Assuming the particular OS uses an increasing numerical version scheme when newer versions are released, node 301-A would be discarded since it uses version 3.0. Since nodes 301-B and 301-C use versions greater than 3.0, these nodes would be identified as eligible for being selected as the target node.

As described above, in such instances where more than one node satisfies the threshold (nodes 301-B and 301-C), workload execution manager 142 can select the first node that it identifies (e.g., node 301-B). As shown, since node 301-B has been identified first, this node has been selected as the target node. Alternatively, workload execution manger 142 can identify all nodes that satisfy the threshold, then select a target node from that group. In some instances, this selection can be performed randomly (or pseudo-randomly). Alternatively, workload execution manager 142 can identify the target node by determining which of the nodes that satisfies the threshold also has the closest match to the resource preferences associated with the workload. For example, if node 301-C has resource attributes (e.g., amount of memory, number of processors, presence of a particular graphics processing unit (GPU), etc.) that are a closer match to the preferences associated with workload 315, then node 301-C can be selected as the target node rather than node 301-B.

It should be noted that while FIGS. 3A-3B illustrate examples of node selection based on a particular set of preferences, on other implementations, other preferences can be utilized by the workload execution manager to drive selection of a target node for executing a workload.

Figure 4:
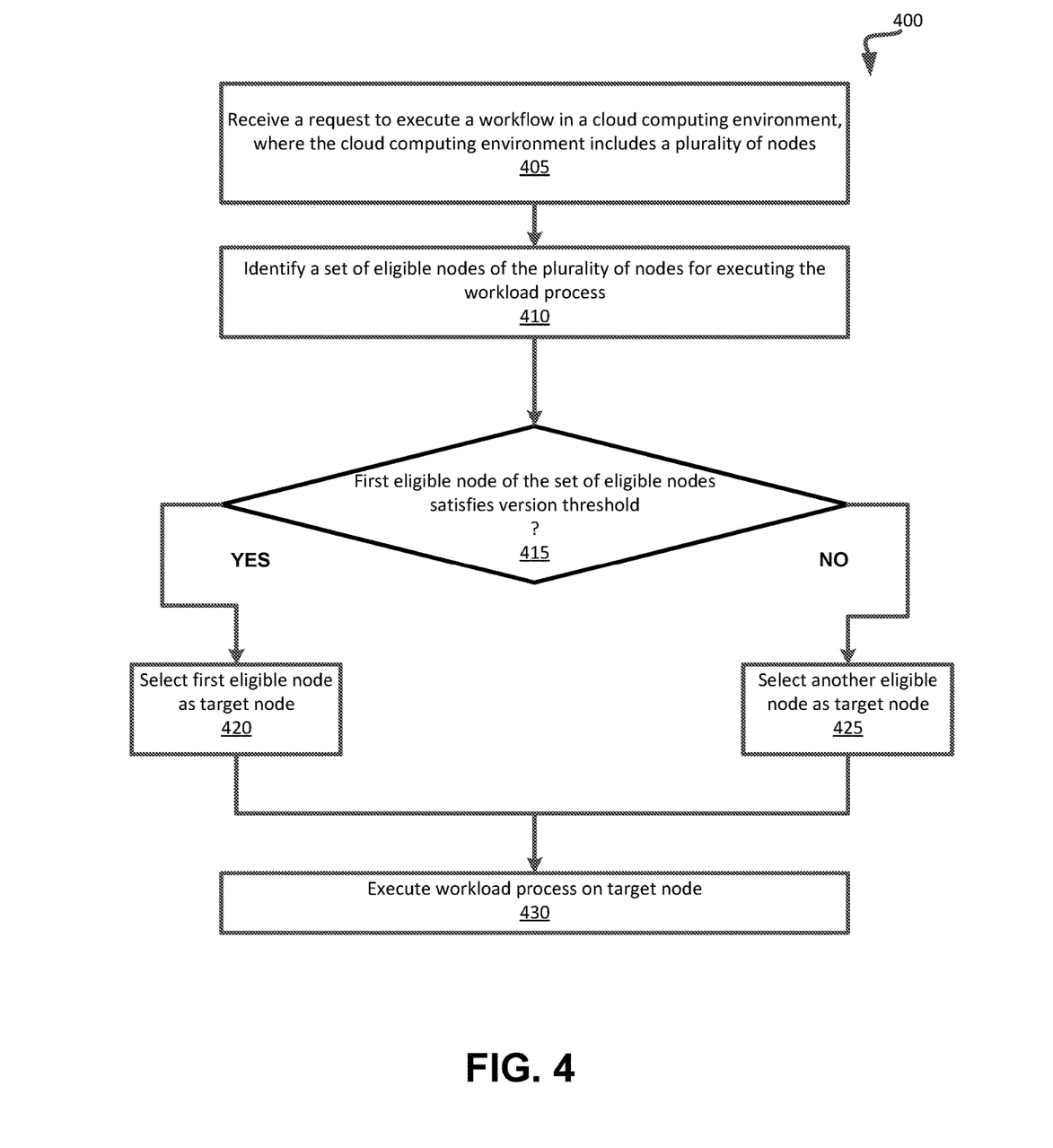
FIG. 4 depicts a flow diagram of a method for facilitating efficient node identification for executing workloads in a cloud computing environment, in accordance with one or more aspects of the present disclosure.

FIG. 4 depicts a flow diagram of an example method 400 for facilitating efficient node identification for executing workloads in a cloud computing environment. The method may be performed by processing logic that may comprise hardware (circuitry, dedicated logic, etc.), computer readable instructions (run on a general purpose computer system or a dedicated machine), or a combination of both. In an illustrative example, method 400 may be performed by workload execution manager 142 in FIG. 1. Alternatively, some or all of method 400 might be performed by another module or machine. It should be noted that blocks depicted in FIG. 4 could be performed simultaneously or in a different order than that depicted.

Figure 5:
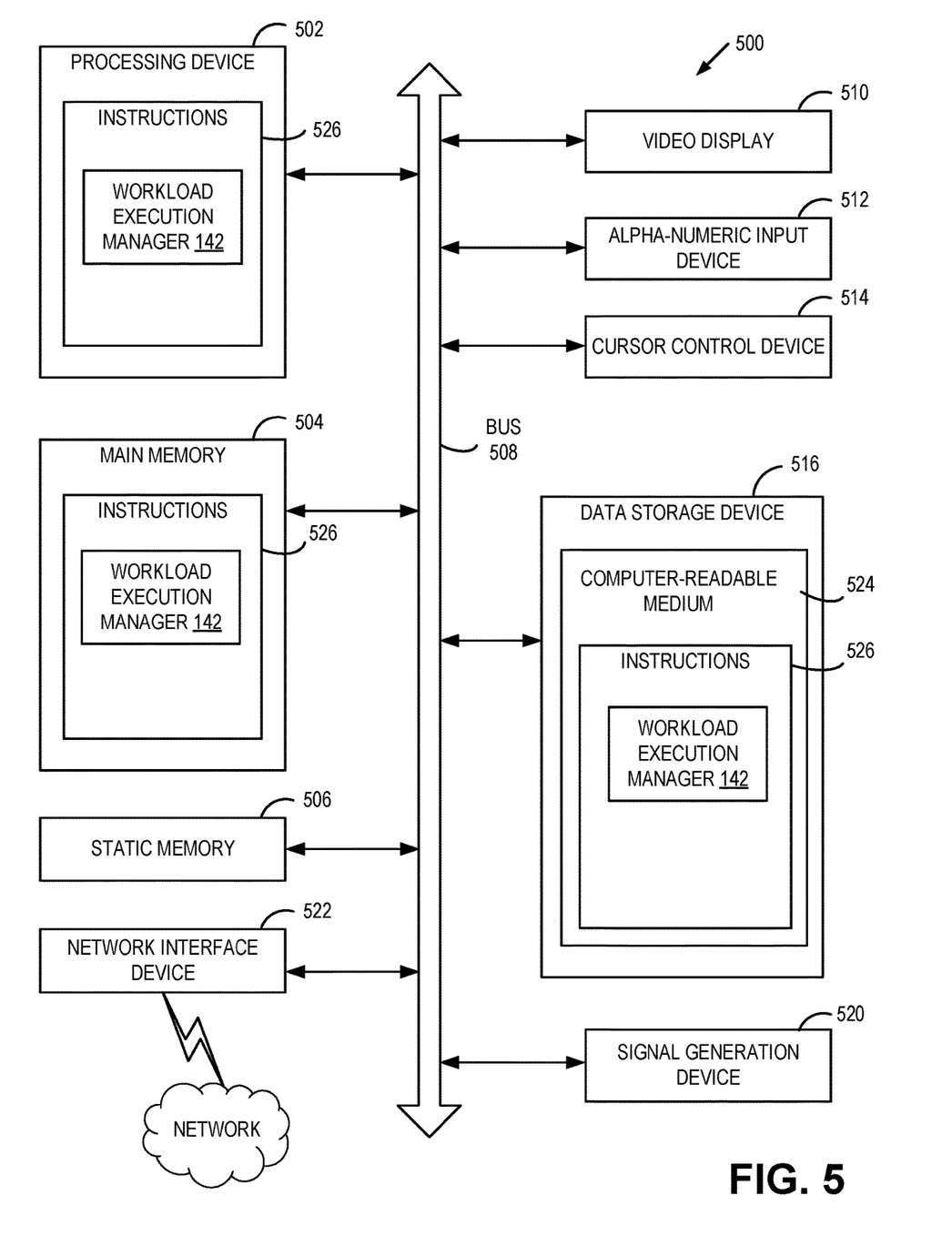
FIG. 5 depicts a block diagram of an illustrative computer system operating in accordance with one or more aspects of the present disclosure.

At block 405, processing logic receives a request to execute a workload process in a cloud computing environment, wherein the cloud computing environment comprises a plurality nodes. At block 410, processing logic identifies a set of eligible nodes of the plurality of nodes for executing the workload process. At block 415, processing logic determines whether a first eligible node of the set of eligible nodes satisfies a version threshold. At block 420, processing logic selects the first eligible node as the target node for executing the workload process. At block 425, processing logic selects another eligible node from the set of eligible nodes for executing the workload process. At block 430, processing logic executes the workload process on the target node FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes workload execution manager 142 for performing the operations and steps discussed herein (e.g., corresponding to the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include workload execution manager 142 (e.g., corresponding to the method of FIG. 4, etc.) embodying any one or more of the methodologies or functions described herein. Workload execution manager 142 may also reside, completely or at least partially, within the main memory 504 and/or within the processing device 502 during execution thereof by the computer system 500, the main memory 504 and the processing device 502 also constituting computer-readable media. Workload execution manager 142 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "identifying," "selecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method, comprising:
   receiving a request to execute a workload process in a cloud computing environment, wherein the cloud computing environment comprises a plurality of nodes, and wherein the workload process is scheduled to be executed on a to-be-updated node in the plurality of nodes;
   identifying a set of eligible nodes of the plurality of nodes for executing the workload process;
   determining, by a processing device, whether a first eligible node of the set of eligible nodes satisfies a version threshold;
   responsive to determining that the first eligible node satisfies the version threshold, selecting the first eligible node as a target node for executing the workload process; and
   executing the workload process on a first pod of the target node instead of the to-be-updated node.

2. The method of claim 1, wherein identifying the set of eligible nodes of the plurality of nodes for executing the workload process comprises:
   determining one or more node resource preferences associated with the workload process;
   comparing the one or more node resource preferences to resource attributes for each node of the plurality of nodes; and
   identifying the set of eligible nodes in view of the comparing.

3. The method of claim 2, wherein the one or more node resource preferences comprise at least one of a processor preference, a memory allocation preference, a graphics processing unit (GPU) preference, a virtual machine (VM) preference, or a storage allocation preference.

4. The method of claim 1, wherein determining whether the first eligible node of the set of eligible nodes satisfies the version threshold comprises:

receiving information indicating an operating system (OS) version preference associated with the workload process;
   determining whether the OS version preference associated with the workload process matches an OS version associated with the first eligible node; and
   responsive to determining the OS version preference matches the OS version associated with the first eligible node, determining that the first eligible node satisfies the version threshold.

5. The method of claim 4, further comprising:
   responsive to determining the OS version preference does not match the OS version associated with the first eligible node:
   determining that the first eligible node does not satisfy the version threshold; and
   selecting another node from the set of eligible nodes for executing the workload process.

6. The method of claim 1, wherein determining whether the first eligible node of the set of eligible nodes satisfies the version threshold comprises:
   determining a corresponding operating system (OS) version for each node of the set of eligible nodes;
   determining whether an OS version associated with the first eligible node is a most recently released OS version in relation to the corresponding OS version for other nodes of the set of eligible nodes; and
   responsive to determining that the OS version associated with the first eligible node is the most recently released OS version in relation to the corresponding OS version for other nodes of the set of eligible nodes, determining that the first eligible node satisfies the version threshold.

7. The method of claim 5, wherein the OS version preference comprises at least one of a specific OS version or a most recently released OS version.

8. The method of claim 1, wherein the workload process comprises at least one of a container process, a virtual machine (VM) process, or an application process.

9. The method of claim 1, wherein at least a portion of the workload process is executed while at least a portion of an update process is performed on the to-be-updated node.

10. A system, comprising:
    a memory; and
    a processing device, operatively coupled to the memory, to:
    receive a request to execute a workload process in a cloud computing environment, wherein the cloud computing environment comprises a plurality of nodes, and wherein the workload process is scheduled to be executed on a to-be-updated node in the plurality of nodes;
    identify a set of eligible nodes of the plurality of nodes for executing the workload process;
    select, in view of a version threshold, a first eligible node from the set of eligible nodes as a target node for executing the workload process; and
    execute the workload process on a first pod of the target node instead of the to-be-updated node.

11. The system of claim 10, wherein to identify the set of eligible nodes of the plurality of nodes for executing the workload process, the processing device is further to:
    determine one or more node resource preferences associated with the workload process;
    compare the one or more node resource preferences to resource attributes for each node of the plurality of nodes; and identify the set of eligible nodes in view of the comparison.

12. The system of claim 11, wherein the one or more node resource preferences comprise at least one of a processor preference, a memory allocation preference, a graphics processing unit (GPU) preference, a virtual machine (VM) preference, or a storage allocation preference.

13. The system of claim 10, wherein the processing device is further to:
receive information indicating an operating system (OS) version preference associated with the workload process;
determine whether the OS version preference associated with the workload process matches an OS version associated with the first eligible node; and
responsive to a determination that the OS version preference matches the OS version associated with the first eligible node, determine that the first eligible node satisfies the version threshold.

14. The system of claim 13, wherein the processing device is further to:
responsive to a determination that the OS version preference does not match the OS version associated with the first eligible node:
determine that the first eligible node does not satisfy the version threshold; and
select another node from the set of eligible nodes for executing the workload process.

15. The system of claim 10, wherein the processing device is further to:
determine a corresponding operating system (OS) version for each node of the set of eligible nodes;
determine whether an OS version associated with the first eligible node is a most recently released OS version in relation to the corresponding OS version for other nodes of the set of eligible nodes; and
responsive to a determination that the OS version associated with the first eligible node is the most recently released OS version in relation to the corresponding OS version for other nodes of the set of eligible nodes, determine that the first eligible node satisfies the version threshold.

16. The system of claim 13, wherein the OS version preference comprises at least one of a specific OS version or a most recently released OS version.

17. A non-transitory computer-readable medium comprising instructions, which when accessed by a processing device, cause the processing device to:
receive a request to execute a workload process in a cloud computing environment, wherein the cloud computing environment comprises a plurality of nodes, and wherein the workload process is scheduled to be executed on a to-be-updated node in the plurality of nodes;
identify a set of eligible nodes of the plurality of nodes for executing the workload process;
determine, by the processing device, whether a first eligible node of the set of eligible nodes satisfies a version threshold;
responsive to a determination that the first eligible node satisfies the version threshold, select the first eligible node as a target node for executing the workload process; and
execute the workload process on a first pod of the target node instead of the to-be-updated node.

18. The non-transitory computer-readable medium of claim 17, wherein to identify the set of eligible nodes of the plurality of nodes for executing the workload process, the instructions, when accessed by the processing device, cause the processing device further to:
determine one or more node resource preferences associated with the workload process;
compare the one or more node resource preferences to resource attributes for each node of the plurality of nodes; and
identify the set of eligible nodes in view of the comparison.

19. The non-transitory computer-readable medium of claim 17, wherein to determine whether the first eligible node of the set of eligible nodes satisfies the version threshold, the instructions, when accessed by the processing device, cause the processing device further to:
receive information indicating an operating system (OS) version preference associated with the workload process;
determine whether the OS version preference associated with the workload process matches an OS version associated with the first eligible node; and
responsive to a determination that the OS version preference matches the OS version associated with the first eligible node, determine that the first eligible node satisfies the version threshold.

20. The non-transitory computer-readable medium of claim 17, wherein to determine whether the first eligible node of the set of eligible nodes satisfies the version threshold, the instructions, when accessed by the processing device, cause the processing device further to:
determine a corresponding operating system (OS) version for each node of the set of eligible nodes;
determine whether an OS version associated with the first eligible node is a most recently released OS version in relation to the corresponding OS version for other nodes of the set of eligible nodes; and
responsive to a determination that the OS version associated with the first eligible node is the most recently released OS version in relation to the corresponding OS version for other nodes of the set of eligible nodes, determine that the first eligible node satisfies the version threshold.

* * * * *

UNITED STATES PATENT AND TRADEMARK OFFICE
CERTIFICATE OF CORRECTION

| | | |
|---|---|---|
| PATENT NO. | : 12,147,848 B2 | Page 1 of 1 |
| APPLICATION NO. | : 17/445543 | |
| DATED | : November 19, 2024 | |
| INVENTOR(S) | : Yaniv Kaul | |

It is certified that error appears in the above-identified patent and that said Letters Patent is hereby corrected as shown below:

In the Specification

In Column 1, Line 4, above BACKGROUND, below the invention title, please insert:
-- TECHNICAL FIELD
The present disclosure is generally related to computer systems, and more particularly, to efficient node identification for executing workloads in cloud computing systems. --

Signed and Sealed this
Third Day of June, 2025

Coke Morgan Stewart
*Acting Director of the United States Patent and Trademark Office*